(12) United States Patent
Smith

(10) Patent No.: US 9,640,966 B1
(45) Date of Patent: May 2, 2017

(54) DUPLEX ELECTRICAL CONNECTOR WITH INSERT

(71) Applicant: BRIDGEPORT FITTINGS, INC., Stratford, CT (US)

(72) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 15/208,960

(22) Filed: Jul. 13, 2016

(51) Int. Cl.
*H02G 3/18* (2006.01)
*H02G 15/117* (2006.01)
*H02G 15/113* (2006.01)

(52) U.S. Cl.
CPC ......... *H02G 15/117* (2013.01); *H02G 15/113* (2013.01)

(58) Field of Classification Search
CPC .......................... H02G 15/113; H02G 15/117
USPC ........................................................ 174/660
See application file for complete search history.

(56) References Cited

U.S. PATENT DOCUMENTS

| | | | | |
|---|---|---|---|---|
| 2,657,251 A | * | 10/1953 | Bergan | H02G 3/0683 174/654 |
| 3,006,981 A | * | 10/1961 | Weber | H02G 3/0683 174/541 |
| 3,052,748 A | * | 9/1962 | Curtiss | H01R 4/64 174/41 |
| 3,369,071 A | * | 2/1968 | Tuisku | H02G 3/065 174/650 |
| 3,384,393 A | * | 5/1968 | Horton | H02G 3/0616 174/665 |
| 3,667,783 A | * | 6/1972 | Sotolongo | H02G 3/0616 174/665 |
| 3,858,151 A | | 12/1974 | Paskert | |
| D243,405 S | * | 2/1977 | Mooney | D13/149 |
| 4,012,578 A | | 3/1977 | Moran | |
| 4,021,604 A | * | 5/1977 | Dola | H02G 3/0616 174/51 |
| 4,621,166 A | | 11/1986 | Neuroth | |
| 4,880,387 A | | 11/1989 | Stikeleather et al. | |
| 4,885,429 A | * | 12/1989 | Schnittker | H02G 3/0691 174/668 |
| 4,990,721 A | * | 2/1991 | Sheehan | H02G 3/0666 174/660 |
| 5,171,164 A | | 12/1992 | O'Neil et al. | |
| 5,189,258 A | | 2/1993 | Pratesi | |
| 5,266,050 A | * | 11/1993 | O'Neil | H02G 3/0625 174/659 |
| D360,188 S | * | 7/1995 | Kiely | D13/152 |
| 5,731,543 A | * | 3/1998 | Jorgensen | H02G 3/0691 174/661 |

(Continued)

*Primary Examiner* — Timothy Thompson
*Assistant Examiner* — Rhadames J Alonzo Miller
(74) *Attorney, Agent, or Firm* — Billion & Armitage; John F. Klos

(57) ABSTRACT

A duplex cable connector assembly including a connector body with an insert and spring clip including a first free end for engaging a side wall of an electrical box upon installation. The insert provides both a sleeve insulator at an end of the connector assembly and a cable divider portion to guide and separate cables. During insertion of the connector body the first free end is deformed so as to permit further insertion into the electrical box. Once the connector body is fully inserted, the spring clip cooperates with a lug on the connector body to hold the connector assembly onto the electrical box.

20 Claims, 12 Drawing Sheets

(56) References Cited

U.S. PATENT DOCUMENTS

| | | | |
|---|---|---|---|
| 5,789,706 A * | 8/1998 | Perkins | H02G 3/0691 174/135 |
| D404,362 S * | 1/1999 | Auray | D13/152 |
| 6,020,557 A * | 2/2000 | Jorgensen | H01R 13/745 174/650 |
| 6,034,326 A * | 3/2000 | Jorgensen | H02G 3/0691 174/660 |
| 6,043,432 A * | 3/2000 | Gretz | H02G 3/0691 16/2.1 |
| 6,080,933 A * | 6/2000 | Gretz | H02G 3/0691 16/2.1 |
| 6,162,995 A * | 12/2000 | Bachle | H02G 15/04 174/151 |
| 6,194,661 B1 * | 2/2001 | Gretz | H01R 13/745 174/153 R |
| 6,335,488 B1 * | 1/2002 | Gretz | H02G 3/0691 16/2.1 |
| 6,355,884 B1 * | 3/2002 | Gretz | H01R 13/745 174/659 |
| 6,444,907 B1 | 9/2002 | Kiely | |
| 6,521,831 B1 * | 2/2003 | Gretz | H01R 13/745 174/153 R |
| 6,555,750 B2 | 4/2003 | Kiely | |
| 6,596,939 B1 | 7/2003 | Gretz | |
| 6,682,355 B1 * | 1/2004 | Gretz | H02G 3/0691 174/663 |
| 6,768,057 B2 | 7/2004 | Blake | |
| 6,849,803 B1 * | 2/2005 | Gretz | H02G 3/0691 16/2.1 |
| 6,860,758 B1 | 3/2005 | Kiely | |
| 6,872,886 B2 | 3/2005 | Kiely | |
| 6,916,988 B1 | 7/2005 | Auray | |
| 6,957,968 B1 | 10/2005 | Gretz | |
| 7,057,107 B2 | 6/2006 | Auray et al. | |
| 7,064,272 B2 | 6/2006 | Auray et al. | |
| 7,075,007 B2 * | 7/2006 | Auray | F16L 5/00 174/656 |
| 7,154,054 B1 * | 12/2006 | Gretz | H02G 3/0666 16/2.1 |
| 7,161,095 B1 * | 1/2007 | Gretz | H02G 3/0666 16/2.1 |
| 7,205,489 B2 * | 4/2007 | Auray | H01R 4/646 174/650 |
| 7,214,890 B2 | 5/2007 | Kiely et al. | |
| 7,226,309 B1 * | 6/2007 | Gretz | H01R 13/5808 174/660 |
| 7,238,894 B1 * | 7/2007 | Gretz | H02G 3/0666 16/2.1 |
| 7,304,251 B1 * | 12/2007 | Gretz | H02G 3/0691 174/653 |
| 7,347,401 B1 * | 3/2008 | Gretz | F16L 3/222 248/68.1 |
| 7,381,088 B1 * | 6/2008 | Gretz | H01R 13/5804 174/661 |
| 7,390,979 B1 * | 6/2008 | Johnson | H02G 3/0691 16/2.1 |
| 7,390,980 B1 * | 6/2008 | Gretz | H02G 3/06 16/2.1 |
| 7,442,079 B1 * | 10/2008 | Gretz | H02G 3/0691 174/661 |
| 7,485,806 B1 * | 2/2009 | Gretz | H02G 3/0666 174/135 |
| 7,488,905 B2 * | 2/2009 | Kiely | H01R 13/745 174/650 |
| 7,495,184 B1 * | 2/2009 | Gretz | H01R 13/5812 16/2.1 |
| 7,576,290 B1 * | 8/2009 | Korcz | H02G 3/0691 16/2.1 |
| 7,723,623 B2 * | 5/2010 | Kiely | F16L 5/00 174/650 |
| 7,824,213 B1 * | 11/2010 | Korcz | H01R 13/5816 174/64 |
| 7,854,627 B1 * | 12/2010 | Gretz | 439/557 |
| 8,124,891 B1 * | 2/2012 | Gretz | H02G 3/0691 164/137 |
| 8,476,541 B1 * | 7/2013 | Kiely | H02G 3/081 174/656 |
| 2005/0121211 A1 * | 6/2005 | Diggle, III | H02G 1/085 174/19 |
| 2005/0218284 A1 * | 10/2005 | kurrasch | A47G 1/20 248/303 |
| 2005/0269122 A1 * | 12/2005 | Pyron | H02G 3/0691 174/666 |
| 2006/0289194 A1 * | 12/2006 | Kiely | H01R 13/745 174/78 |
| 2007/0017688 A1 * | 1/2007 | Pyron | H01R 13/5219 174/59 |
| 2008/0149388 A1 * | 6/2008 | Kiely | F16L 5/00 174/659 |
| 2010/0071954 A1 * | 3/2010 | Kiely | H01R 9/032 174/88 R |
| 2010/0084854 A1 * | 4/2010 | Sathyanarayana | H02G 3/0691 285/84 |
| 2010/0163304 A1 * | 7/2010 | Auray | F16L 5/00 174/72 C |
| 2011/0290550 A1 * | 12/2011 | Kiely | H02G 3/0691 174/480 |
| 2012/0024597 A1 * | 2/2012 | Jafari | H02G 3/0691 174/665 |
| 2014/0262486 A1 * | 9/2014 | Korcz | H05K 5/0247 174/520 |

* cited by examiner

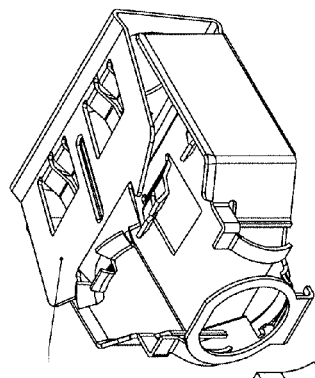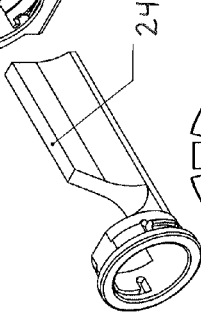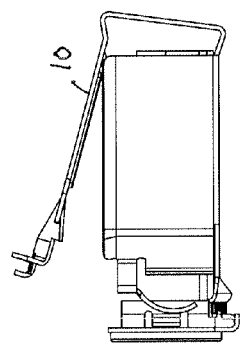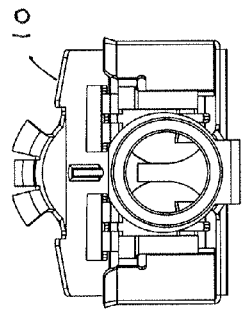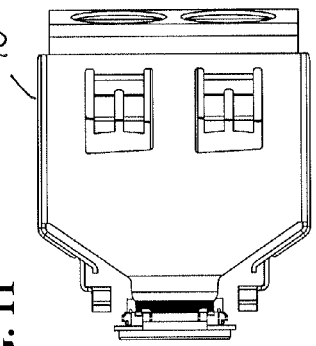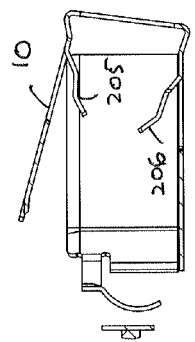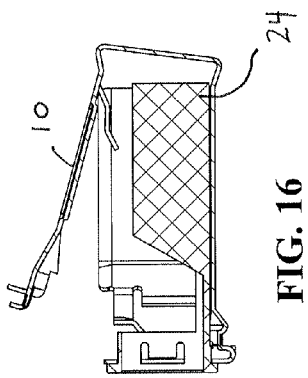

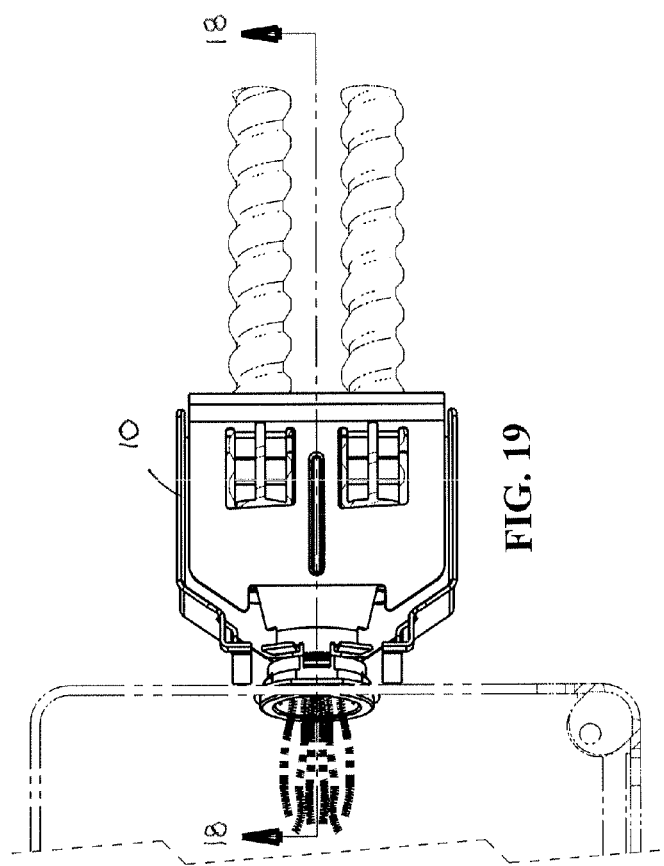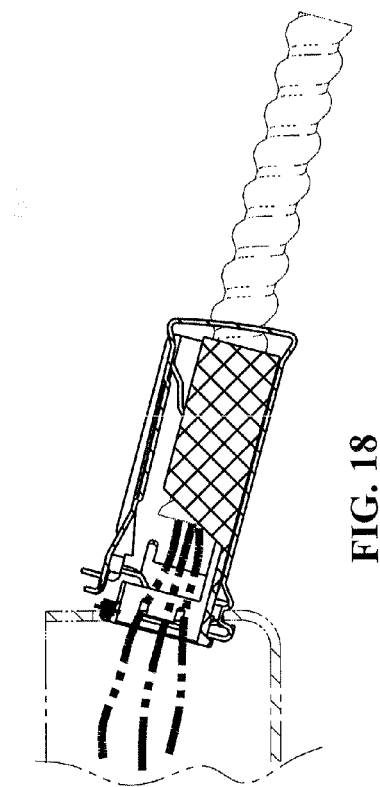

DUPLEX ELECTRICAL CONNECTOR WITH INSERT

TECHNICAL FIELD

The invention is directed to a further advancement in the field of electrical connector assemblies. More specifically, this application relates to an electrical connector assembly having an integral retaining spring for facilitating the connection of the connector assembly and associated cable, wire conductor and the like to an electrical box.

BACKGROUND OF THE INVENTION

Electrical connectors are commonly used for attaching electrical conductors, cables, wires, electrical metal tubing (EMT) or the like to an electric box, e.g. a junction box, outlet box, switch box, fuse box, or other similar type of electric box. Such known electrical connectors are either of a type that are secured to an electric box by a threaded lock nut or by means of a snap fit retaining structure or other securing means.

So called "snap fit" connectors have been in use for some time. Such connectors have typically been coupled to the junction box by forcibly inserting one end of the connector into the knock-out hole of a junction box. Such connectors include a retaining structure which is deformed during insertion of the connector body into a knock-out hole. In the past, a generally linear motion has been used to insert the connector end into the junction box. Using such a straight motion, the connector end is pushed into the knock out hole so as to deform a retaining ring as it passes through the knock-out hole. As the snap-type connectors are constructed of several pieces, the complexity of the connector is increased. A need exists for a simple connector having fewer component parts.

Also known are one-piece electrical cable connectors having integral retaining springs. The connector includes a body having two spaced apart spring arms extending from an end of the body and angled inwardly to engage the cable and couple the cable to the connector. A coupling tab for coupling to the electrical box is provided.

SUMMARY OF THE INVENTION

The present invention provides a duplex connector assembly including a connector body having an integral spring clip and multi-function insert defining a combined insulator and internal cable divider. The insert functions as both an electrical insulator at the outlet end portion of the duplex connector assembly and as a mechanical divider to guide and keep the cables separate from each other, for example to prevent misalignment of the cables upon insertion into the connector assembly. The spring clip functions to both retain the connector assembly upon an electrical box and also retain both cables. A free end of the spring clip engages the knock-out hole during installation. Additionally, a spring clip panel includes a plurality of spring arms used to retain the cable. Once the connector body is fully seated, the free end of the spring clip cooperates with a lug to secure the connector assembly onto the electrical box.

The present invention is also directed to a method of using a connector assembly, wherein the method includes inserting a pair of cables into the connector assembly with the insert providing both electrical insulation and mechanical alignment of the cables, then inserting a nose end of the connector assembly into the knock-out hole with the free end of the spring clip being deflected prior to contact with a side wall of the junction box, then pivoting and further inserting the connector assembly into the junction box to release the free end and lock the connector body in place. As the connector body is pivoted during installation into the junction box, the free end of the spring clip is initially depressed and then released after a hooked portion of the spring clip enters the junction box.

An object of the present invention is to provide a duplex electrical connector with an insulator/divider insert and an integral spring clip whereby the connector body is secured to an outlet box through a simple angled insertion and pivoting motion.

The duplex connector assembly of the invention has a body having a spring clip with a free end that latches or hooks to an edge of an opening in the electrical box and at least one curved spring arm that biases against an interior wall of the electrical box. The connector body engages the cable and connects the assembly to the electrical box.

In one embodiment of the invention, the duplex connector assembly provides a spring clip integrally formed with a body and includes inwardly directed arms that engage the outer surface of the cable to retain the cable in the axial passage of the body. The spring clip has a distal end with a coupling hook that engages edge surfaces of the electrical box at a knockout opening.

A further aspect of the invention is to provide a duplex connector assembly with a spring clip having arm members integrally formed with a common panel to engage and grip the cable. The spring arms extend into the body of the connector to grip the cable. The spring clip is biased outwardly to engage the edge of the opening in the electrical box while the position of the spring arms applies an inward biasing force against the cable.

A further aspect of the invention is to provide a duplex connector assembly without the typical annular stop flange for limiting insertion of the fitting into the outlet box opening and for providing electrical continuity or grounding of the fitting to the wall of the electrical box. In one embodiment of the invention a pair of curved springs function to limit insertion of the fitting into the electrical box. The pair of curved springs cooperate with the spring clip to limit insertion of the fitting into the electrical box. The curved springs improve electrical continuity and mechanically secure the connector assembly at the knockout hole to limit rotation of the connector assembly relative to the electrical box.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 10 is a perspective view of the connector body 20 and insert 24 comprising the connector assembly 10.

FIG. 11 is a side elevation view of the connector assembly 10 of FIG. 10.

FIG. 12 is a front elevation view of the connector assembly 10 of FIG. 10

FIG. 13 is a rear elevation view of the connector assembly 10 of FIG. 10.

FIG. 14 is a top plan view of the connector assembly of FIG. 10.

FIG. 15 is a bottom plan view of the connector assembly of FIG. 10.

FIG. 16 is a cross-sectional view of the connector assembly 10 taken along lines 16-16 in FIG. 14.

FIG. 17 is a cross-sectional view of the connector assembly 10 taken along lines 17-17 in FIG. 14.

FIG. 13 is a cross-sectional view of the connector assembly of FIG. 12 taken along lines 13-13.

FIGS. 14-16 are cross-sectional views of the connector assembly of FIG. 1.

FIG. 17 is a top view of a metal blank used to form the connector body of the connector assembly of FIG. 1.

FIGS. 18-22 depict steps in the installation of the connector assembly of FIG. 1 into an electrical box.

DETAILED DESCRIPTION OF THE INVENTION

Figure 1:
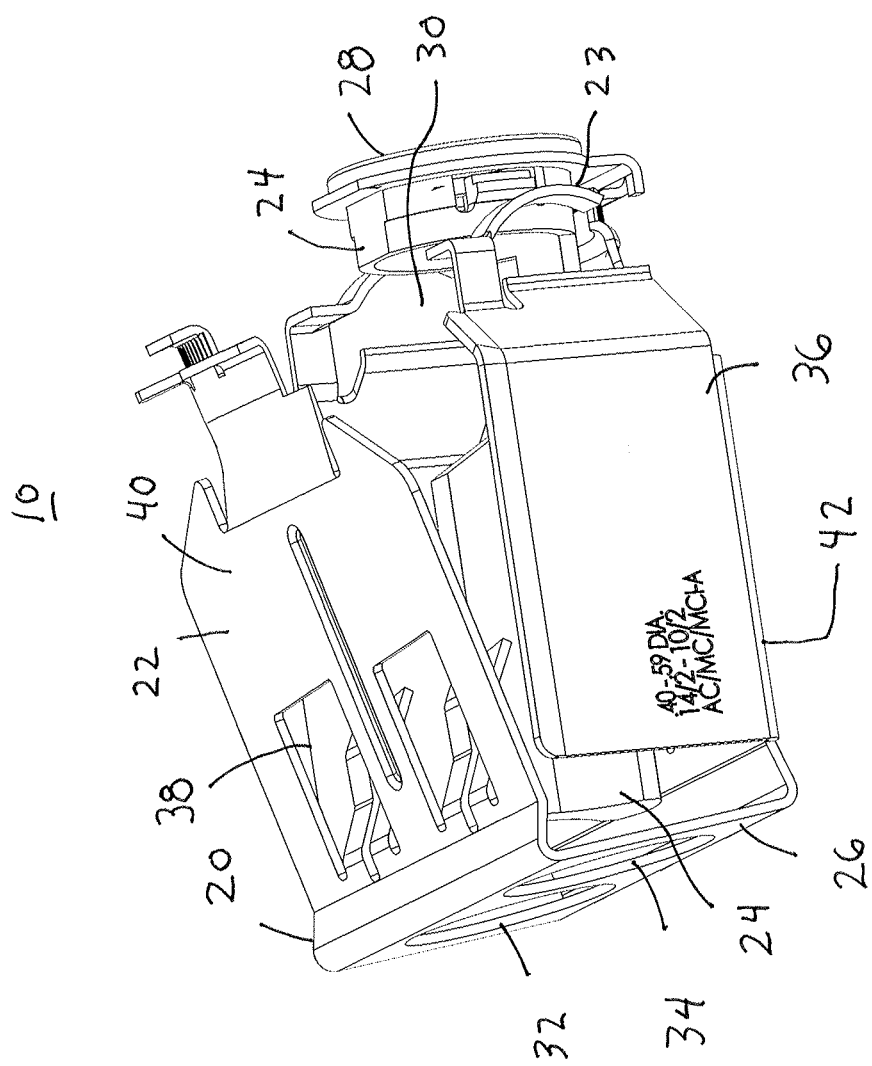
FIG. 1 is a perspective view of an electrical connector assembly in accordance with the present invention.
Figure 2:
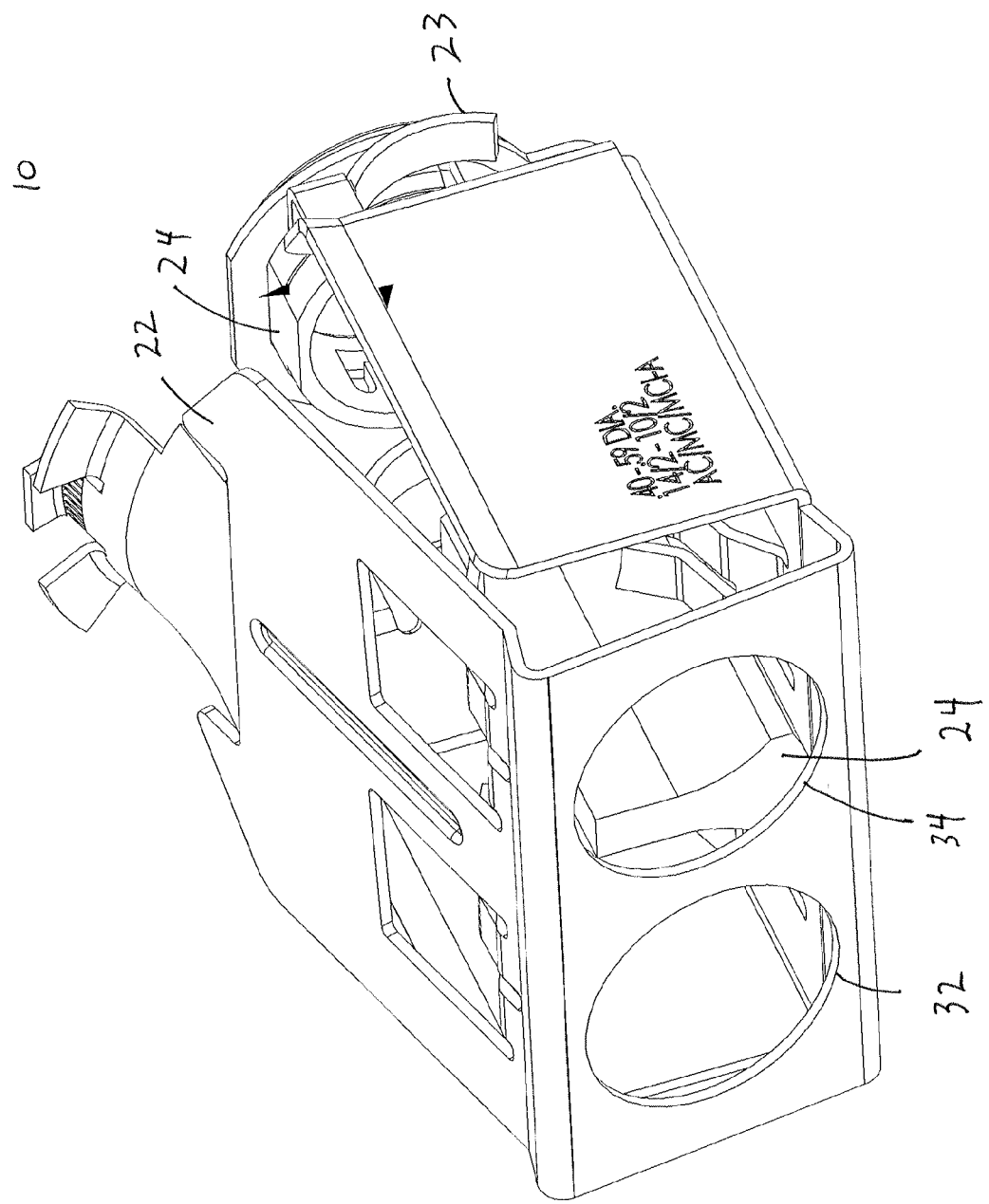
FIG. 2 is a perspective view of the electrical connector assembly of FIG. 1.

Referring to FIGS. 1 and 2, duplex connector assembly 10 includes one-piece stamped metal connector body 20 defining a spring clip 22 and curved springs 23, and an insert 24 of electrically insulating material defining both a generally circular sleeve insulator and an internal cable divider. Connector body 20 includes an inlet end portion 26 and an outlet end portion 28 and a passage 30 extending therethrough. Connector assembly 10 includes a pair of rear openings 32, 34 for receiving a pair of electrical cables and a forward opening providing access into the electrical box or related structure. Connector body 20 includes a pair of generally parallel sides 36, 38 each carrying one of the curved spring 23 and an upper surface 40 and lower surface 42. Spring clip 22 is defined upon upper surface 40.

Figure 3:
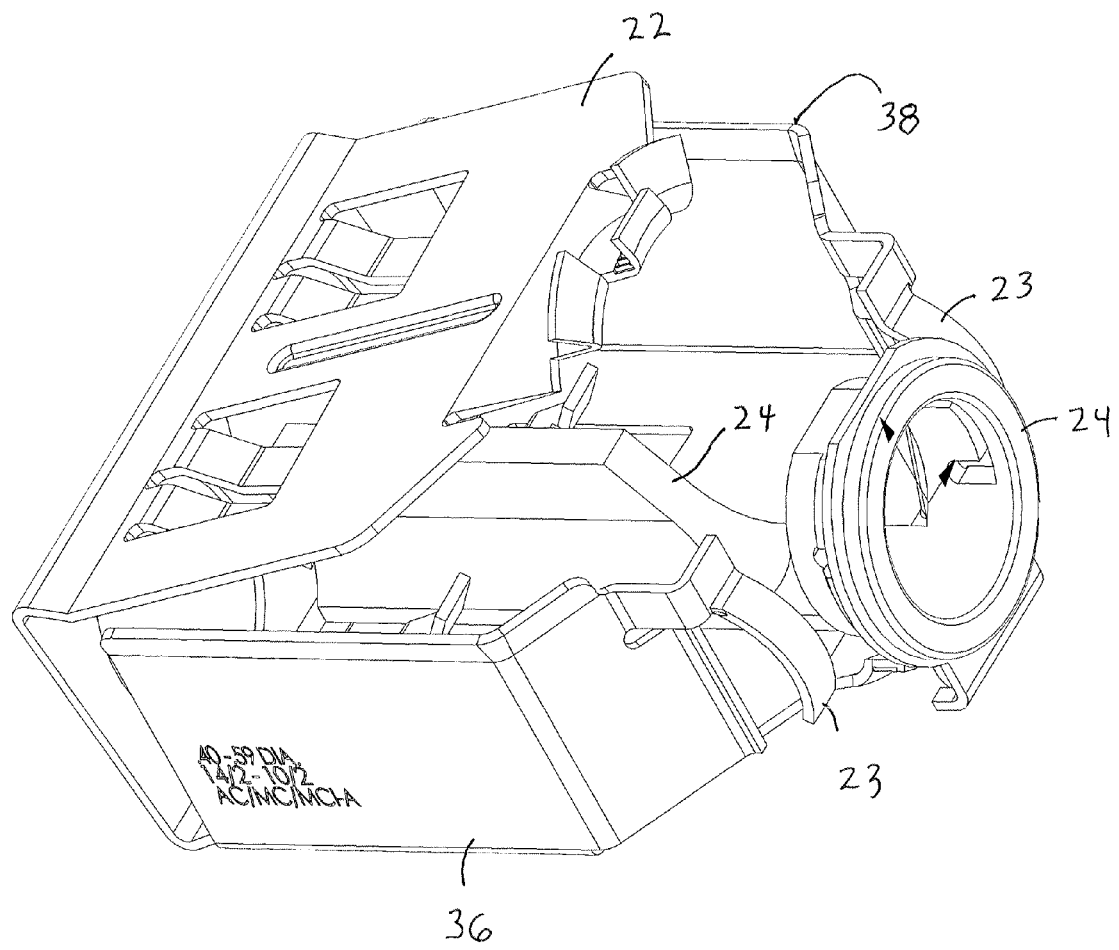
FIG. 3 is a perspective view of the electrical connector assembly of FIG. 1.
Figure 20:
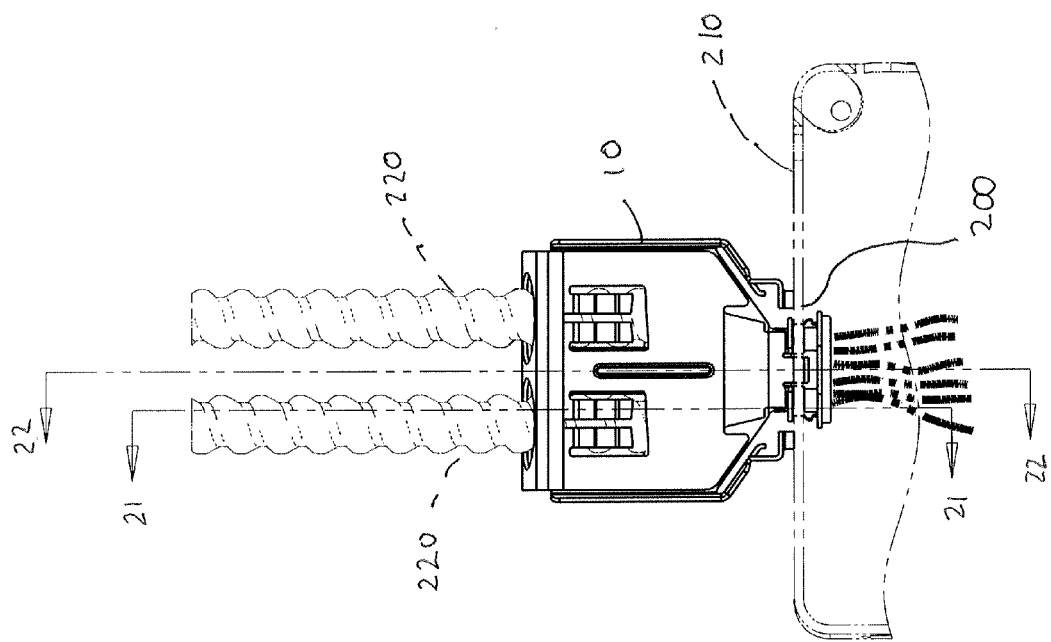

Referring to FIG. 3, intermediate the connector body 20, in the illustrated embodiment between the inlet end portion 26 and outlet end portion 28, there is provided a pair of curved springs 23 which function as stops to limit the degree to which connector body 20 may be inserted through the knock-out hole 200 of electrical box 210 (FIG. 20). Curved springs 23 contact the front face of the electrical box 210 upon installation. Springs 23 function to improve electrical continuity and to mechanically secure the connector assembly 10 at the knock-out hole 200. Springs 23 also function to limit rotation of the connector assembly 10 upon installation. Outlet end portion 28 includes a lug structure 44 adapted to engage a knock-out hole 200. As described in more detail hereinafter, lug structure 44 is part of a positive locking mechanism by which the connector body 20 is secured to electrical box 210.

Figure 4:
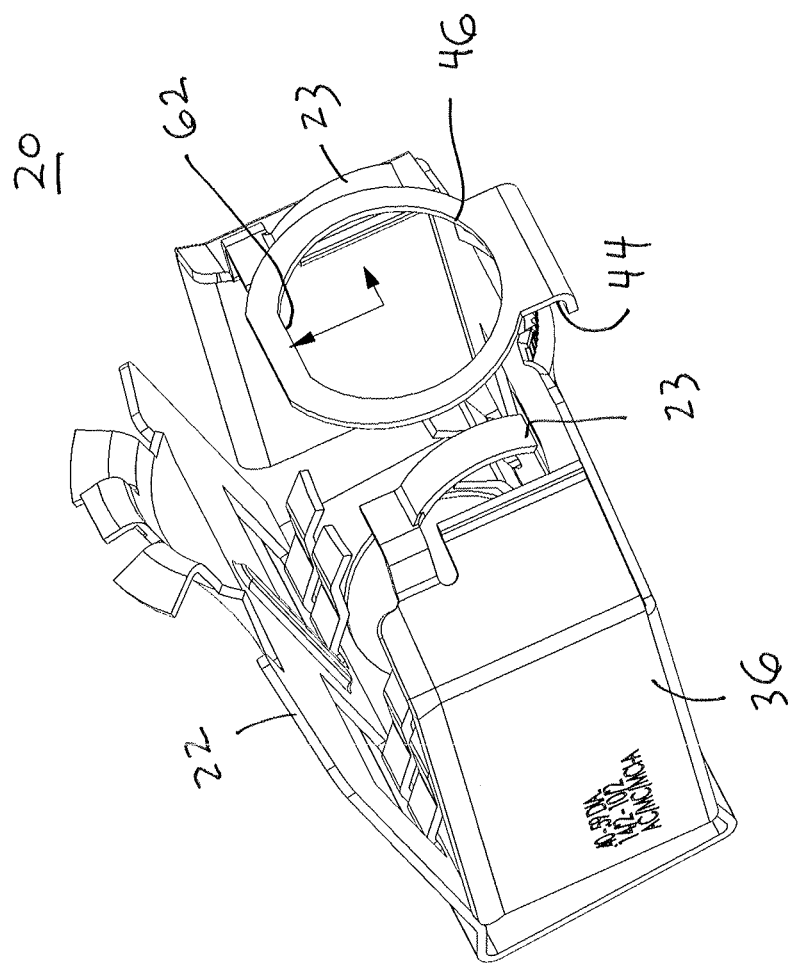
FIG. 4 is a perspective view of the connector body component of the connector assembly of FIG. 1.

Referring to FIG. 4, the connector body 20 of connector assembly 10 is shown without insert 24. Insert 24 is inserted into the generally circular opening 46 in a direction generally parallel to a longitudinal axis of connector body 20.

Figure 5:
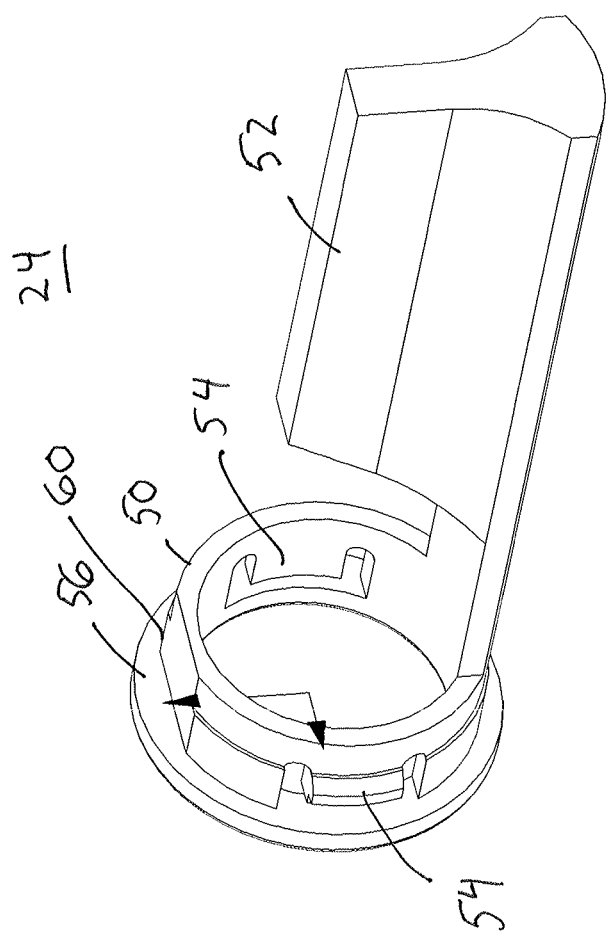
FIGS. 5 and 6 are perspective views of the insert component of the connector assembly of FIG. 1.
Figure 6:
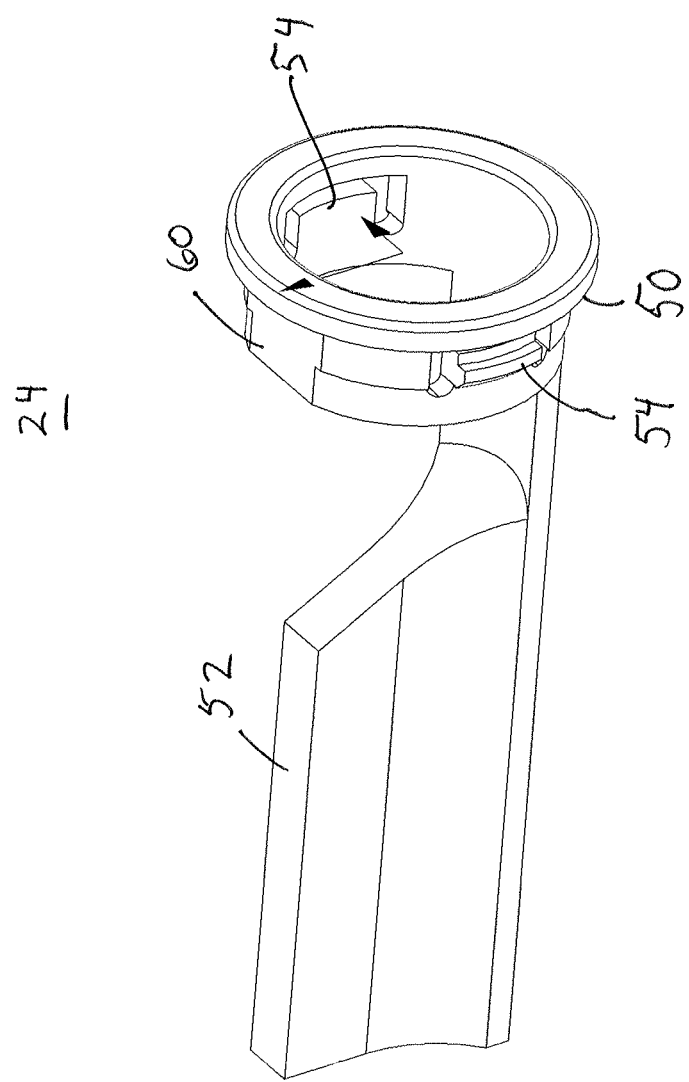

Referring to FIGS. 5 and 6, insert 24 is of electrically insulative material and includes a generally circular sleeve insulator portion 50 which engages a forward opening at the outlet end portion 28 of connector body 20. Sleeve portion 50 defines an axial passage for receiving electrical wires from electrical cables 14. Insert 24 also includes a cable divider portion 52 which functions to guide and separate the pair of cables during installation and use. Insert 24 is prevented from substantial movement along the longitudinal axis of connector body 20 by a pair of locking tabs 54 adapted to engage the underside near the opening. A collar or circular flange 56 prevents insert 24 from passing entirely through opening 46. Insert 24 is prevented from rotation about the longitudinal axis by a pair of corresponding flat portions 60, 62. Flat portion 60 is defined on an upper surface of the insert 24 and flat portion 62 is defined on an upper edge of opening 46 (shown in FIG. 4). Insert 24 is preferably formed from a molded rigid plastic material as a one piece member.

Figure 7:
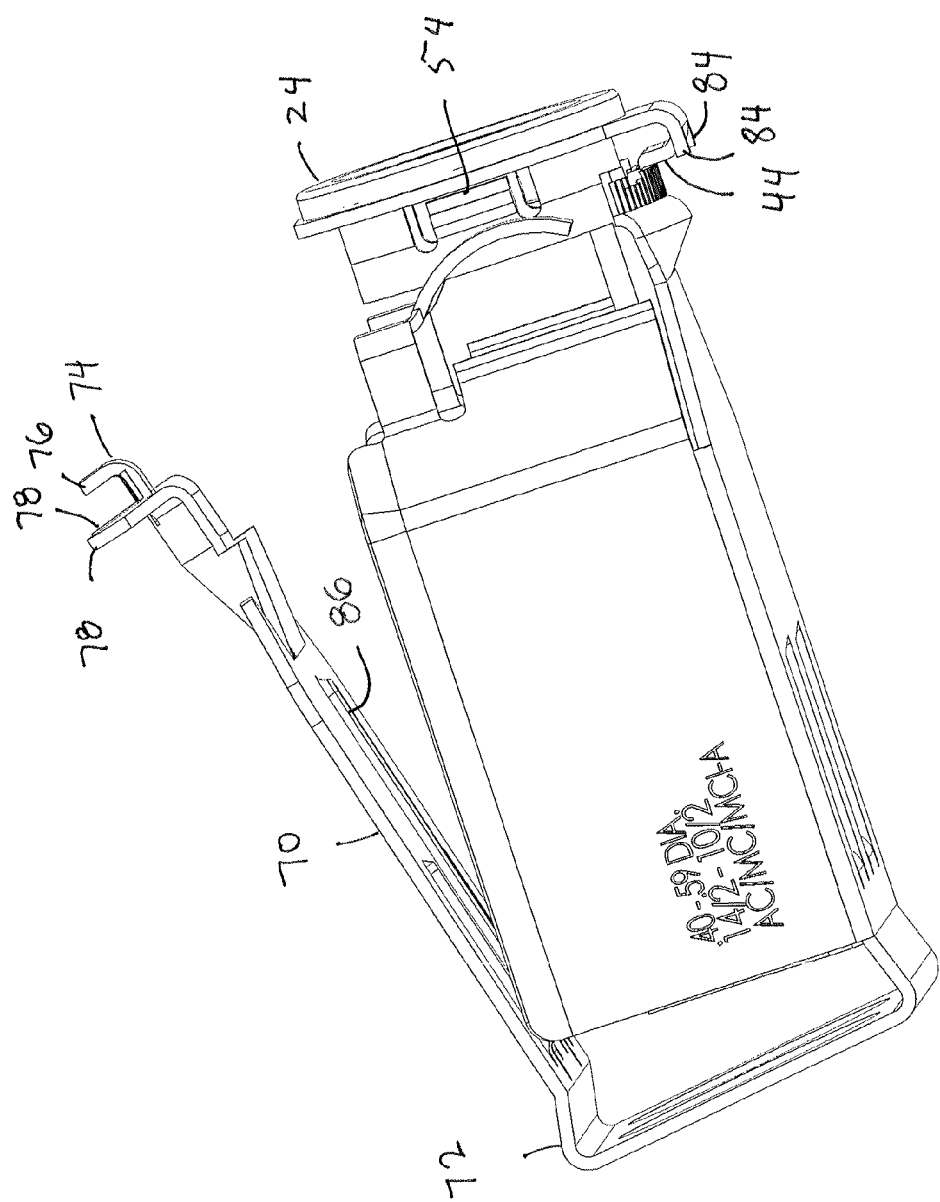
FIG. 7 is another perspective view of the connector assembly of FIG. 1.

Referring to FIG. 7, spring clip 22 includes a central portion 70 positioned between an anchor end 72 and a free end 74. Spring free end 74 includes a hook structure including a hook 76 and a pair of tabs 78. Together the hook 76 and tabs 78 engage surfaces of the electrical box 210 to secure the connector assembly to the box and to provide additional electrical continuity between the connector assembly 10 and the electrical box 210. A stiffening rib 86 is provided on the upper surface 36 of the connector body 20. Rib 86 limits the degree of deflection of upper surface 40 when the spring free end 74 is biased inwardly, such as during installation of the connector assembly 10 upon an electrical box.

Figure 8:
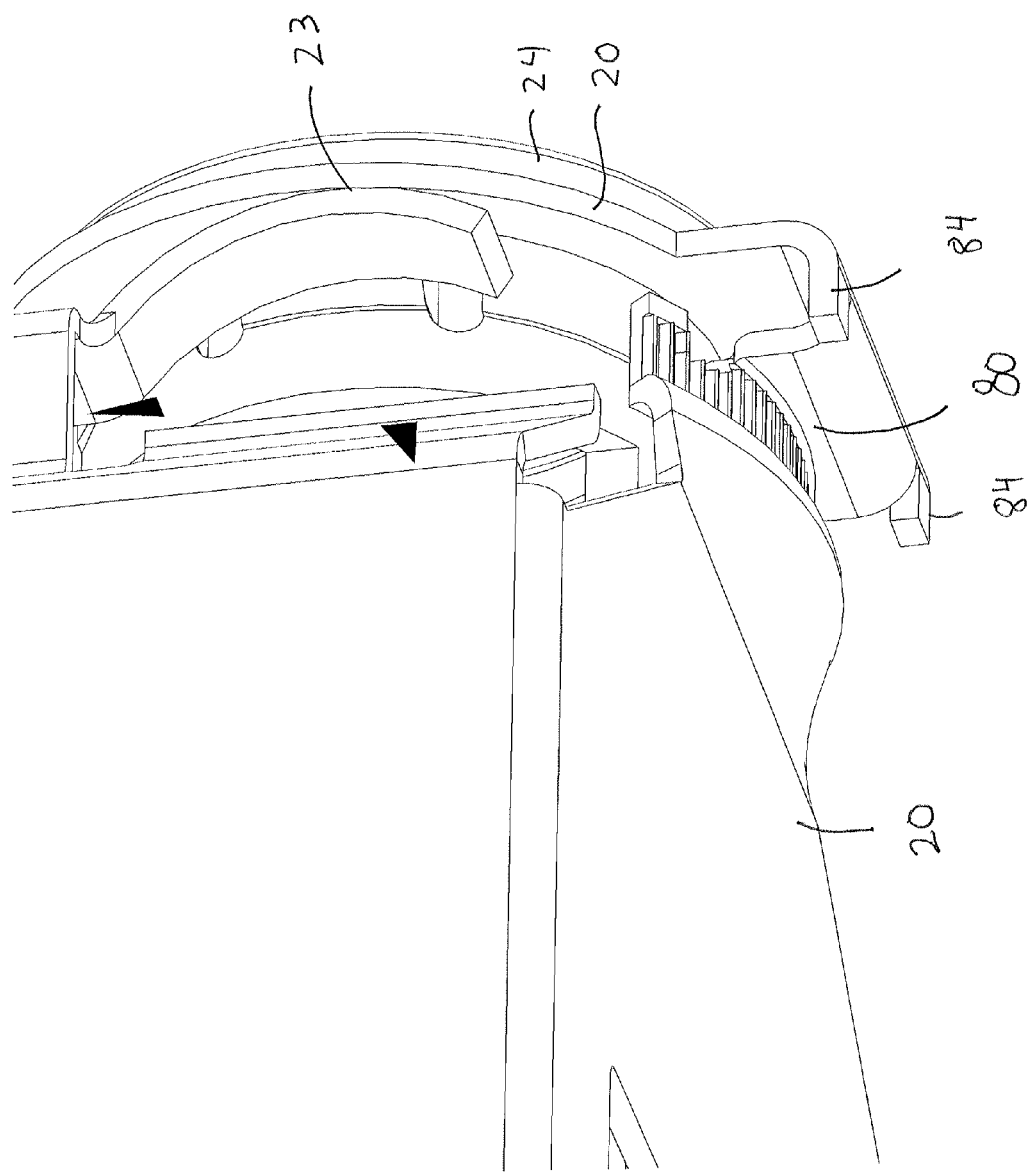
FIG. 8 is a detailed view of the connector assembly of FIG. 7.

Referring to FIG. 8, lug structure 44 includes a central portion 80 and a pair of offset legs 84 to stabilize connection between the connector body 20 and the electrical box. Upon installation in the electrical box, offset legs 84 and hook 80 engage the interior surface of the electrical box while the spring arms 23 and pair of tabs 78 engage the exterior surface of the electrical box.

Figure 9:
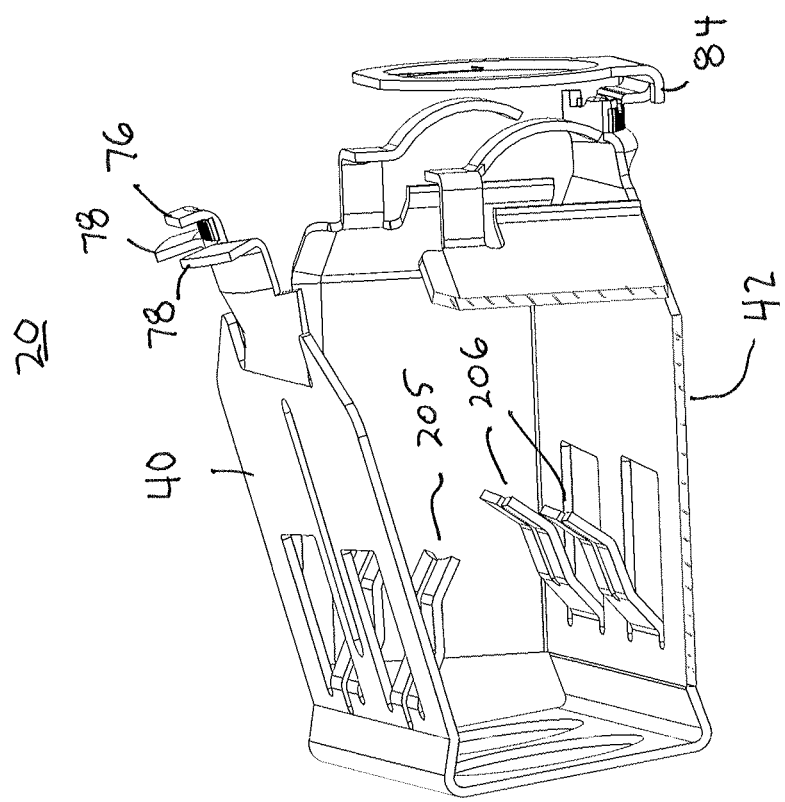
FIG. 9 is a cross-sectional perspective view of the connector assembly of FIG. 1.
Figure 22:
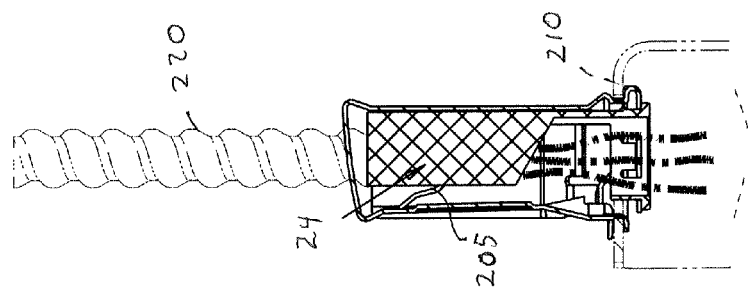
Figure 21:
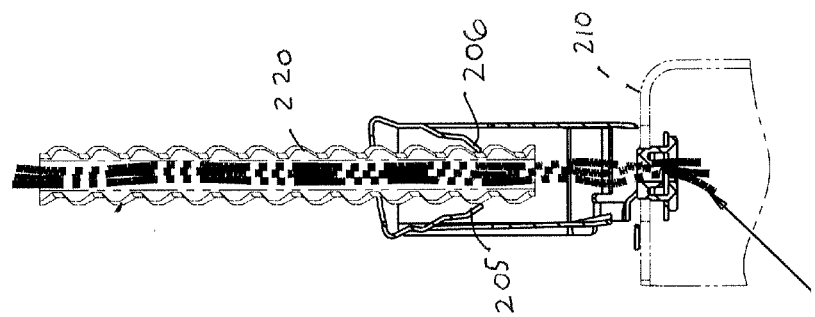

Referring to FIG. 9, a plurality of cable retaining spring arm members 205, 206 are provided on connector body 20. Upper surface 40 of connector body 20 includes a pair of cable retaining spring arm members 205 functioning to engage and secure the electrical cables 220 (as shown in FIGS. 20-22). Arm members 205 extend from upper surface 40 at an incline in a generally forward direction (toward outlet end portion 28). Lower surface 42 of connector body 20 also includes a pair of cable retaining spring arm members 206. Arm members 205, 206 are oriented at an angle of about 45° relative to respective sides. The arm members 205, 206 can be staggered at slightly different angles for improved gripping of the spiraled surface of the armored sheath of electrical cable 14.

As depicted, pairs of arm members 205 and 206 are diametrically opposed to each other and function in tandem to engage and secure the electrical cable 220.

Arm members 205, 206 are preferably constructed with sloping intermediate sections and sloping end sections. In addition, the terminating ends of each arm member 205, 206 have an arcuate curve for securely engaging the outer surface of any cable member mounted therewith. Furthermore, the overall lengths of the arm members 205, 206 may be substantially equal or varied relative to each other, depending upon the configuration desired.

FIG. 10 is a perspective view of the connector body 20 and insert 24 comprising the connector assembly 10.

FIG. 11 is a side elevation view of the connector assembly 10 of FIG. 10.

FIG. 12 is a front elevation view of the connector assembly 10 of FIG. 10

FIG. 13 is a rear elevation view of the connector assembly 10 of FIG. 10.

FIG. 14 is a top plan view of the connector assembly of FIG. 10.

FIG. 15 is a bottom plan view of the connector assembly of FIG. 10.

FIG. 16 is a cross-sectional view of the connector assembly 10 taken along lines 16-16 in FIG. 14.

FIG. 17 is a cross-sectional view of the connector assembly 10 taken along lines 17-17 in FIG. 14.

FIG. 18 is a cross-sectional view of the connector assembly 10 taken along lines 18-18 in FIG. 19.

FIG. 19 is a top plan view of the connector assembly 10 in relation to an electrical box 210 and pair of cables.

FIG. 20 is a top plan view of the connector assembly 10 securing a pair of electrical cables 220 to an electrical box 210.

FIG. 21 is a cross-sectional view of the connector assembly 10 taken along lines 21-21 in FIG. 20.

FIG. 22 is a cross-sectional view of the connector assembly 10 taken along lines 22-22 in FIG. 20.

The connector assembly 10 is especially useful for securing MC (metal clad) or armored cables to a panel or electrical box. MC or armored cables include a convoluted outer surface consisting of peaks and grooves such as shown in FIGS. 20 and 22.

Electrical cable 220 is coupled to connector assembly 10 by feeding wires through the passage of cable connector body 20 and through the passage of the sleeve insulator portion 50 of insert 24. Cable 220 is passed through the passage so that arm members 205, 206 engage the outer surface of the armored sheath of electrical cable 14, as shown in FIGS. 20 and 21. Arm members 205, 206 are spring biased in a direction to engage the corrugations of the armored sheath and resist separation of cable 14 from cable connector 10.

Upon insertion, hook 80 engages an inner surface of electrical box 210 and tabs 78 engage an outer surface of electrical box 210. When the outlet end portion 28 is inserted into electrical box 210, the hook 80 is initially depressed (by pressing on spring clip 22) and then released to secure the connector assembly 10 to the electrical box. A pair of cable retaining springs arm members 205, 206 engage cable 220, preferably within a cable groove, and provide a force tending to resist withdrawal of cable 220 from connector assembly 10.

Embodiments of connector assemblies of the present invention are designed to secure MC (metal clad) or AC (armor clad) cables or ⅜" flexible metal conduit (FMC) to an electrical box or enclosure. The connectors may accept multiple versions of these cables, for example ¹⁴⁄₂ or ¹⁰⁄₃, which may vary in outer diameter from 0.420" to 0.600". The flexible nature of the spring clip 22 and internal guide ribs permit the connector assembly 10 to be utilized across a range of cable diameters. In other embodiments of the present invention, other cable types and sizes may be utilized.

Referring to FIG. 18 through FIG. 22, a method of using a connector assembly 10 can be described. A pair of cables 220 is inserted into the pair of rear openings of the connector body. As the cables are inserted, the insert 24 functions to guide and align the pair of cables. Arm members 205, 206 make contact with the cable 220 as the cables are inserted. The arm members 205, 206 function to hold the connector body 20 on the cable 14. As shown in FIG. 19, lug 40 is initially inserted to engage a lower edge portion of knockout hole 16 and connector body 20 is then rotated generally about lug 40. During installation, spring clip 22 is deflected into the connector body 20 to allow hook 80 to pass into the interior of the electrical box 210. Upon insertion, as shown in FIG. 22, spring clip 22 is released and hook 80 engages inner surface of the electrical box 210 and tabs 82 engage outer surfaces of the electrical box 210.

Connector assembly 10 can be removed from the electrical box 210 in reverse manner by depressing the spring clip 22 to release the hook portion 80 from the knock-out hole 200 in electrical box 210 and pivoting connector assembly 10 downwardly. If necessary, cable 220 can be separated from the connector assembly 10 by lifting upwardly on spring clip 22 to release the arm members 205, 206 from contact with the electrical cable.

The present invention is also directed to a method of using a connector assembly 10, wherein the method includes guiding and aligning a pair of cables 220 with the internal insert 24 and subsequently inserting lug 44 at an outlet end portion 28 of the connector assembly into the knock-out hole 16 with a free end of the spring clip 22 being deflected prior to contact with a side wall of the electrical box 210, then pivoting and further inserting the connector assembly 10 into the electrical box 210 to release the free end and lock the connector body 20 in place with a hook 80 and tab 78 structure. As the connector body 20 is pivoted during installation into the electrical box 210, the hook end of the spring clip 22 is initially depressed and then released after the hook 80 of the spring clip 22 enters the electrical box.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An electrical connector assembly for securing an electrical cable to an electrical box comprising:
    a duplex cable connector body having an inlet end portion and an outlet end portion and a passage therebetween; and
    an insert retained at the outlet end portion of said connector body, said insert including a sleeve insulator portion at the outlet end portion and a cable divider portion extending away from the sleeve insulator portion toward the inlet end portion of the connector body, with said connector body including a spring clip secured to said connector body at the inlet end portion and extending away from the inlet end portion toward the insulator, said spring clip including a hook for engaging an inner surface of the electrical box to retain the connector body to the electrical box, and with at least one arm member extending into the connector body for retaining the cable within the connector body.

2. The connector assembly of claim 1 wherein the cable divider portion of the insert defines a cable guide for controlling movement of the cable within the passage of the connector body.

3. The connector assembly of claim 1 wherein the insert is received into the outlet end portion of the connector body.

4. The connector assembly of claim 3 wherein the insert includes a flange to limit insertion of the insert into the connector body.

5. The connector assembly of claim 4 wherein the sleeve insulator portion is generally cylindrical with a flat portion engaging a flat portion of the connector body to prevent rotation of the insert relative to the connector body.

6. The connector assembly of claim 1 further comprising a pair of curved springs acting as stops to limit the degree to which said connector body is inserted into the electrical box.

7. The connector assembly of claim 1 wherein the spring clip includes a pair of tabs adapted to engage an outer surface of the electrical box.

8. The connector assembly of claim 1 wherein the spring clip includes a pair of arm members extending into the connector body for retaining the cable within the connector body.

9. An electrical connector assembly for securing an electrical conductor to an electrical box comprising:
    a duplex cable connector body having an inlet end portion and an outlet end portion and a passage therebetween; and
    an insert received into the outlet end portion, said insert including a sleeve insulator portion and a cable divider portion positioned within the passage, with the connector body including a spring clip having a first free end extending away from the inlet end portion and spanning an open portion of the connector body, said spring clip including a hook for engaging an inner surface of the electrical box to retain the connector body to the electrical box, and said spring clip including two pair of inwardly directed arm members extending toward the outlet end portion of the connector body for retaining the electrical conductor within the connector body, with the cable divider portion of the insert being positioned between said two pair of arm members.

10. The connector assembly of claim 9 wherein the spring clip further comprises a pair of tabs adapted to engage an outer surface of the electrical box.

11. The connector assembly of claim 9 further comprising a pair of curved springs acting as stops to limit the degree to which said connector body is inserted into the electrical box.

12. The connector assembly of claim 9 further comprising a pair of arm members on a side of the connector body opposite the spring clip.

13. An electrical connector assembly for securing an electrical conductor to an electrical box comprising:
    a duplex cable connector body having an inlet end portion and an outlet end portion and a passage therebetween; and
    an insert received into the outlet end portion, said insert including a generally circular sleeve insulation portion attached to a cable divider portion positioned within the passage, with the connector body including a spring clip having a first free end extending away from the inlet end portion and spanning an open portion of the connector body, said spring clip including a hook for engaging an inner surface of the electrical box to retain the connector body to the electrical box, said spring clip including a pair of inwardly directed arm members extending toward the outlet end portion of the connector body for retaining the electrical conductor within the connector body, and with the connector body having a pair of curved, cantilevered springs near the outlet end portion of the connector body, said springs adapted to engage an outer surface of the electrical box.

14. The connector assembly of claim 13 wherein the spring clip further comprises a pair of tabs adapted to engage the outer surface of the electrical box.

15. The connector assembly of claim 14 wherein the hook is positioned between the pair of tabs.

16. The connector assembly of claim 13 further comprising a pair of arm members on a side of the connector body opposite the spring clip.

17. A method of securing a pair of cables to an electrical box using a duplex connector assembly comprising:
    providing a duplex connector assembly having a connector body, an insert received into the connector body, and a spring clip, said spring clip having a free end and extending across an open portion of the connector body and, said spring clip further including a hook and a pair of tabs at its free end;
    inserting a pair of cables into the connector body with a cable divider portion of the insert guiding the pair of cables and maintaining a separation between the pair of cables;
    further inserting the pair of cables into the connector body with one or more conductors of the pair of cables extending through a sleeve insulator portion of the insert;
    then inserting an outlet end portion of the connector assembly into a knock-out hole of the electrical box until a perimeter edge of the knock-out hole engages a lug;
    further inserting the outlet end portion into the knock-out hole while depressing the free end of the spring clip to allow the hook to enter the electrical box; and
    releasing the spring clip to allow the hook of the spring clip to engage an inner surface of the electrical box and the pair of tabs to engage an outer surface of the electrical box.

18. The method of claim 17 further comprising:
securing the cable within the connector body with a plurality of arm members.

19. The method of claim 18 wherein said spring clip includes a pair of arm members, and said depressing the free end causes the pair of arm members to deflect in engagement with the cable.

20. The method of claim 19 wherein the cable divider portion of the insert centers the cable between the pair of arm members.

\* \* \* \* \*